Feb. 9, 1943.  E. WILDHABER  2,310,484
METHOD OF PRODUCING GEARS
Filed Nov. 21, 1939  4 Sheets-Sheet 1

Inventor
ERNEST WILDHABER
By
*[signature]*
Attorney

Feb. 9, 1943.   E. WILDHABER   2,310,484
METHOD OF PRODUCING GEARS
Filed Nov. 21, 1939    4 Sheets-Sheet 2

Inventor
ERNEST WILDHABER
Attorney

Feb. 9, 1943.  E. WILDHABER  2,310,484
METHOD OF PRODUCING GEARS
Filed Nov. 21, 1939  4 Sheets-Sheet 3

Inventor
ERNEST WILDHABER
By
Attorney

Inventor
ERNEST WILDHABER
Attorney

Patented Feb. 9, 1943

2,310,484

UNITED STATES PATENT OFFICE 2,310,484

METHOD OF PRODUCING GEARS

Ernest Wildhaber, Brighton, N. Y., assignor to Gleason Works, Rochester, N. Y., a corporation of New York Application November 21, 1939, Serial No. 305,531

27 Claims. (Cl. 90—5)

The present invention relates to the production of gears for transmitting uniform motion and in particular to the generation of longitudinally curved tooth gears, such as spiral bevel and hypoid gears.

In the art of bevel gear cutting, the universal practice for many years was to generate the two members of a pair of bevel gears conjugate, respectively, to complemental crown gears, the theory of production being that if the two members of the pair were conjugate to complemental crown gears, the two mating gears would be conjugate to one another. For quantity production of spiral bevel gears a face mill gear cutter was and is commonly employed. To generate spiral bevel gears conjugate to crown gears with such a cutter a machine may be and was used in which the cutter spindle is mounted parallel to the axis of the cradle. The cutter then represents a tooth surface of a nominal crown gear whose axis is represented by the axis of the cradle and whose top surface, represented by the tip surface of the cutter, is a plane surface perpendicular to the axis of the cutter. Generation is effected by rotating the cutter in engagement with the blank while rotating the blank on its axis at a uniform velocity and simultaneously rotating the cradle on its axis at a uniform velocity in proper timed relation to the work rotation. The machine, which may be used for this method of generation, is relatively simple in construction since the cutter axis may always be parallel to the axis of the cradle.

In recent years, particularly since the introduction of hypoid gears, it has become more and more the practice to cut the ring gear or larger member of a pair of spiral bevel or hypoid gears without generating roll and to generate only the pinion or smaller member of the pair. With this second method of production, conjugacy between the mating gears has heretofore been obtained by generating the pinion directly conjugate to its mate gear or to a tapered gear having substantially the same pitch cone angle as the mate gear. This second method of production results in a very considerable saving in the total production time for a pair of gears, for the ring gear can be cut very much faster without generating roll than would be possible were its tooth surfaces to be generated. This second method, moreover, has the advantage over the earlier method that a much simpler and cheaper machine may be used for cutting or grinding the gear, since the generating motion is eliminated in producing the gear. This second method has heretofore had the disadavantage, however, that a much more complicated machine had to be employed for producing the pinion than was previously required where both the gear and the pinion were generated conjugate to crown gears. The pinion machine had to have, in addition to the ordinary adjustment for spiral angle, cone distance, cone angle, etc., two angular adjustments of the cutter or their equivalent. These adjustments were required in order to position the cutter so that its tip surface was inclined to the axis of the cradle at an angle corresponding to the face angle of the ring gear to which the pinion was to be generated conjugate. This was in order that the cutting surface of the cutter might represent, in the generating operation, the ring gear, which was to mate with the pinion, or a tapered generating gear of approximately the same face angle as the mate ring gear. The axis of the cradle represented the axis of this conical gear. The tooth surfaces of the pinion were generated by rotating the cutter in engagement with the pinion blank while the blank was rotated on its axis at a uniform velocity and while simultaneously the cradle was rotated on its axis at a uniform velocity in proper timed relation to the work rotation.

One object of the present invention is to provide a new method for generating pinions, which are to mesh with non-generated tapered gears, which will enable a machine to be used for generating the pinion that is simpler in construction, cheaper and more rigid than the type of machine heretofore required.

A further object of the invention is to provide a new method of generating pinions conjugate to a non-generated gears, which will permit of employing for the purpose a machine of relatively the same simple construction as the machine previously employed for generating gears and pinions conjugate to a crown gear.

Pinions conjugate to a non-generated gear are now commonly designated in the art as "formate" pinions and the non-generated gears themselves are commonly called "formate" gears. For the sake of brevity these designations will be employed hereinafter.

In the new method of the present invention, in generating a "formate" pinion, the cutter no longer need represent a tapered generating gear. It may be positioned to represent a nominal crown gear. That is, the axis of the cutter may be set parallel to the axis of the cradle. Tooth surfaces are then generated on the pinion conjugate to the mate gear, my making a moderate gradual change in the ratio of roll between cutter and pinion blank during generation. Thus, with the present invention, the tooth surfaces of a spiral bevel or hypoid pinion may be generated by rotating a face mill gear cutter in engagement with the blank while rotating the blank on its axis at a uniform velocity and while producing an additional relative movement between the cutter and blank at a varying velocity about the axis of the cradle which is parallel to the axis of the cutter and which thus represents the axis of a nominal crown gear. Since the cutter may be positioned with its axis parallel to the axis of the cradle, the machine used for generating the "formate" pinion may be similar in construction to the machines heretofore used for producing generated gears. This makes the whole "formate" gear cutting process, which already has the advantage of speed of production, even more attractive. The "formate" gear machine is already simpler, as above sttaed, than a spiral bevel gear generator and with the present invention, the pinion machine becomes substantially as simple as any other spiral bevel gear generator.

Aside from the objects already noted, the present invention has as a further object to increase the range of the known types of "formate" pinion generating machines which have the described two angular adjustments of the cutter. Thus, with the known types of machines, it was impossible to cut a "formate" bevel pinion of a 2 to 1 or 2½ to 1 ratio right angle drive because the cutter could not be tilted enough to permit it to represent the mate non-generated gear or a tapered gear having the same pitch cone angle as the mate non-generated gear. Again, the known types of machines have had definite limitations as to the production of pinions having right hand spiral teeth. Furthermore, naturally, in the known types of machines, the limitations in the two angular adjustments of the cutter have affected one another. Thus cases have occurred where the dimensions of a given pinion might be within the capacity of one angular adjustment of the cutter but outside the range of the necessary corresponding other angular adjustment of the cutter. By modifying the ratio of the generating roll during generation of the tooth surfaces, however, as is done with the present invention, "formate" pinions of any ratio and of either hand can be generated which are otherwise within the range of spiral angle, cone distance and cone angle adjustment of a given machine.

The present invention has for a further object control of the tooth bearing or contact between the teeth of mating gears, particularly of the amount of tooth bearing or contact in the direction of the height of the tooth profiles.

A further object of the present invention is to provide a new process of generating either member of a pair of gears where both members are generated. This has for its purpose to increase still further the range of known types of spiral bevel gear generating machines which are provided with cutter tilt and swivel angle adjustment. Thus, it may be found that the radial settings of the cutter required to cut a mating gear and pinion of a given spiral angle is outside the capacity of the machine if the pair are generated conjugate to crown gears. The present invention permits nevertheless of generating the pair by generating each member of the pair conjugate to a tapered gear of different pitch cone angle from the crown gear. The radial settings of the cutter may thus be brought within the capacity of the machine. The new method of generation requires, of course, an angular adjustment of the cutter so that the cutter may be tilted relative to the cradle axis to represent tapered gears whose settings can be obtained on the generator. With this new method of generation, it is preferred to generate the gear as though it were rolling with a tapered gear having a smaller pitch cone angle than the pitch cone angle of a crown gear. This means that ordinarily it would be necessary to generate the mating pinion conjugate to a tapered gear of increased pitch cone angle whose pitch cone angle is substantially supplementary to the tapered gear to which the ring gear is generated conjugate. By varying the ratio of roll during generation, however, according to the process of the present invention, the pinion may also be generated conjugate to a tapered gear having a pitch cone angle less than 90°. The difference in pitch cone angle is then compensated for by the variation in ratio of roll during generation. This new method of cutting allows of very materially increasing the capacity of known type generating machines especially for generating gear pairs of low or zero spiral angle.

A still further object of the invention is to provide a method for generating angular bevel and hypoid gears of long cone distance but small shaft angle on gear generating machines having a much smaller capacity as regards cone distance but whose size is more in proportion to the size of the gears to be cut. Variation in ratio of roll during generation again allows of generating tooth profiles on the gears and pinions that will transmit uniform motion when the pair are in mesh.

Other objects of the invention will be apparent hereinafter from the specification and from the recital of the appended claims. From the above it will be seen, however, that the present invention has wide application.

Several different applications and embodiments of the invention are illustrated in the accompanying drawings in which.

Reference will now be had to the drawings for a more detailed description of the invention.

Figures 1, 2, 3, 4, 7, 8:
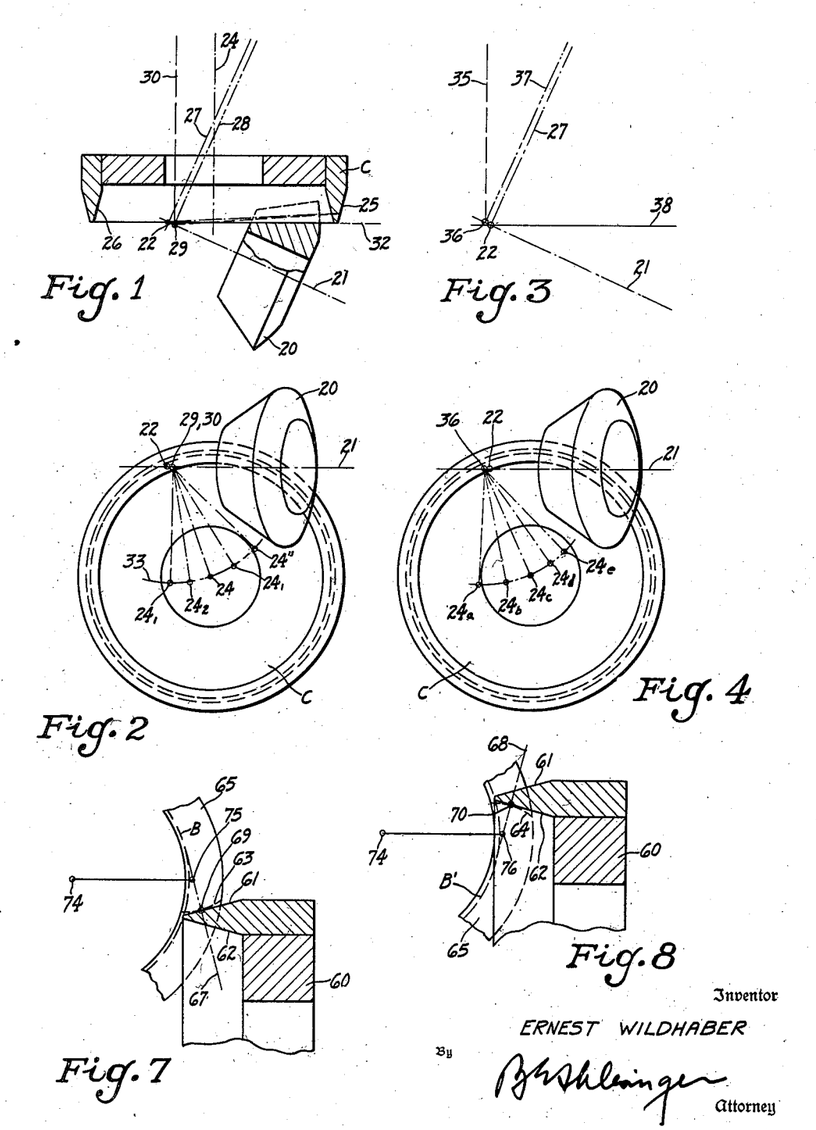
Figs. 1 and 2 are a diagrammatic plan view, partly in section, and a diagrammatic side elevation, respectively, illustrating the method of generating the concave sides of the teeth of a "formate" spiral bevel pinion according to the process of the present invention.
Figs. 3 and 4 are corresponding diagrammatic views illustrating the generation of the convex sides of the teeth of this pinion.
Figs. 7 and 8 are diagrammatic views illustrating how with the method of the present invention a standard face mill gear cutter may be employed to cut the opposite sides of the teeth of a pinion whose pressure angles are different from the pressure angles of the cutter.

In Figs. 1 and 2, 20 denotes the spiral bevel pinion which is to be cut. The axis of this pinion is designated at 21 and its apex at 22. C denotes a face mill gear cutter which may be employed for cutting the pinion. The axis of this cutter is at 24. It has outside cutting edges 25 and inside cutting edges 26. It is assumed that the pinion to be cut is to form one member of a pair of right angular bevel gears where the ring gear or larger member of the pair is to be cut without generating roll.

To generate tooth surfaces on the pinion which will mesh properly with its mate non-generated gear, it has heretofore been considered necessary to generate the pinion conjugate to a gear having substantially the same pitch cone angle as the mate gear. The axis of the mate gear would lie at 27 at right angles to the axis 21 of the pinion and intersecting the axis 21 of the pinion in the pinion apex 22. To generate the tooth surfaces of the pinion, the face mill cutter C might be rotated on its axis 24 in engagement with the pinion blank 20 while the pinion blank itself is rotated at a uniform velocity on its axis 21 and while simultaneously a further uniform rotational movement is produced between the cutter and the blank about the axis 27.

In ordinary practice, however, a generating gear is used that has a slightly different cone distance from the mate gear. The purpose of this is to eliminate an undesirable bearing or tooth contact condition, known in the art as "bias bearing." For the concave sides of the pinion teeth, the generating gear has had a smaller cone distance than the cone distance of the mate gear and for the convex sides of the pinion teeth, the generating gear has had a larger cone distance than the cone distance of the mate gear. Thus, the pinion teeth would be cut with the outside cutting edges 25 of the cutter and conjugate to a tapered gear whose axis was at 28 parallel to the axis 27 of the mate gear but intersecting the axis 21 of the pinion blank in a point 29 slightly offset from the apex 22 of the pinion and lying between the apex 22 and the tooth zone of the pinion. In this case the generating motion comprises rotation of the blank at a uniform rate on its axis 21 and uniform rotational motion between the blank and cutter about the axis 28.

In any event it will be seen that by prior methods the cutter C must be positioned so that its axis 24 is angularly inclined to the axis 27 or 28 of the basic generating gear. In any bevel gear cutting machine, the axis of the cradle represents the axis of the basic generating gear. Thus it will be seen that the prior methods of generating "formate" pinions required the use of a gear generating machine in which the axis of the cutter spindle had to be adjusted angularly with reference to the axis of the cradle.

With the present invention, as already has been indicated, it is proposed to generate "formate" pinions conjugate to nominal crown gears instead of to tapered gears, and to produce the correct tooth shapes by varying the ratio of roll of the cutter and blank during generation. Preferably similar steps are taken to eliminate "bias bearing" as have been employed heretofore in the generation of "formate" pinions. Thus the concave sides of the pinion teeth are preferably generated conjugate to a nominal crown gear whose axis 30 intersects the axis 21 of the pinion blank in a point 29 which is the same as the point of intersection of the axis 28 and axis 21. The instantaneous axis of relative motion between the nominal crown gear and the pinion blank may then be made the same as between the pinion blank and the tapered gear whose axis is at 28. To accomplish this, an instantaneous ratio is employed corresponding to the previously used position of the instantaneous axis. Thus, if the inclination of said instantaneous axis to the root plane 32 of the pinion is $\Delta\gamma$, and $\gamma R$ denotes the root cone angle of the pinion, the instantaneous axis includes an angle $(\gamma R + \Delta\gamma)$ with the pinion axis and the instantaneous ratio between the turning of the work and of the cradle should be $$\frac{\cos \Delta\gamma}{\sin (\gamma R + \Delta\gamma)}$$

In the generation of the concave sides of the teeth of a "formate" pinion, then, according to the present invention, the cutter C is rotated on its axis 24 in engagement with the pinion blank while the pinion blank is rotated on its axis 21 and while simultaneously an additional relative movement is produced between the pinion blank and the cutter about an axis 30 parallel to the cutter axis 24 and representing the axis of a nominal crown gear. Further, during generation of the tooth surfaces of the pinion, the ratio of rotation of the pinion and of the relative rotational movement between cutter and pinion about the axis 30 is continuously modified.

Figure 5:
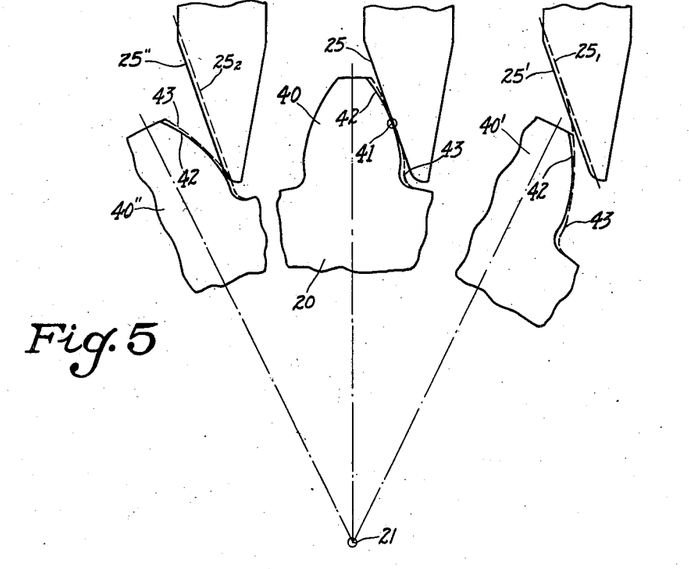
Fig. 5 is a diagrammatic view further illustrating the generation of the concave surfaces of the teeth of the pinion shown in Fig. 1, the view being a developed circumferential section.

Fig. 5 further illustrates the conditions required for generation of correct tooth profiles on the concave sides of a pinion tooth. Here 40 denotes the pinion tooth whose profile 42 is to be generated. The profile 42 can be determined in known manner and is a profile conjugate to the straight profile of the tapered non-generated gear with which the pinion is to mesh. The profile 42 is somewhat more curved than the substantially involute tooth profile 43 shown in dotted line which would be produced were the pinion blank and nominal crown gear rolled together at a uniform velocity according to prior practice in generating a gear or pinion conjugate to a nominal crown gear.

In Fig. 5, 40', 40 and 40" denote different equi-spaced positions of the blank, and $25_1$, 25 and $25_2$ designate corresponding equi-spaced positions of the outside cutting edges of the cutter, during generation of a pinion tooth in the conventional process. It will be seen that through the uniform rotation of the blank and uniform translation of the cutter, the cutting blades will trace and sweep out the involute profile 43. It will be seen, however, that the outside cutting blades of the cutter contact with the desired tooth profile 42 only in the mean position of roll at the mean point 41. At other points in the roll, cutting edges $25_1$ and $25_2$ are spaced from the required profile 42.

By suitably modifying the rolling motion, however, according to the principles of the present invention, the outside cutting edges of the cutter can be brought into contact with the desired profile 42 at all points in the generating roll, so that the cutting edges will generate the required profile 42. Thus the ratio of rolling movement is so modified that at the beginning of the roll the position of the cutter is displaced to the left from the position $25_1$, to the position shown in full line at 25', and that at the end of the roll the outside cutting edge will have been displaced from the position $25_2$ to the full line position 25". Thus the cutter will generate the desired profile 42.

With the modification in the roll, it is denoted that the distance between the cutting edges 25 and 25" is greater than the distance between the cutting edges 25' and 25. For generation of the concave sides of the pinion teeth, then, the translation of the cutter about the nominal crown gear axis 30 is accelerated during the up-roll as compared to prior practice where the rolling motion is performed at a uniform rate and ratio.

The modification in the ratio of roll, which is a feature of the present invention, is further illustrated in Fig. 2 where $24_1$, $24_2$, 24, 24' and 24" denote different positions of the cutter axis for equal turning angles of the work. Here, as in Fig. 5, it is assumed that the generating roll is divided and comprises rotation of the pinion blank on its axis 21 and simultaneous swing of the cutter about the axis 30 of the nominal crown gear. The points $24_1$, $24_2$, 24, 24' and 24" are unequally spaced from one another on the arc 33 concentric to the axis 30 of the crown gear since, as described, the swing of the cutter about the axis of the crown gear is at a non-uniform velocity to secure the desired modification in the ratio of generating roll.

Figure 6:
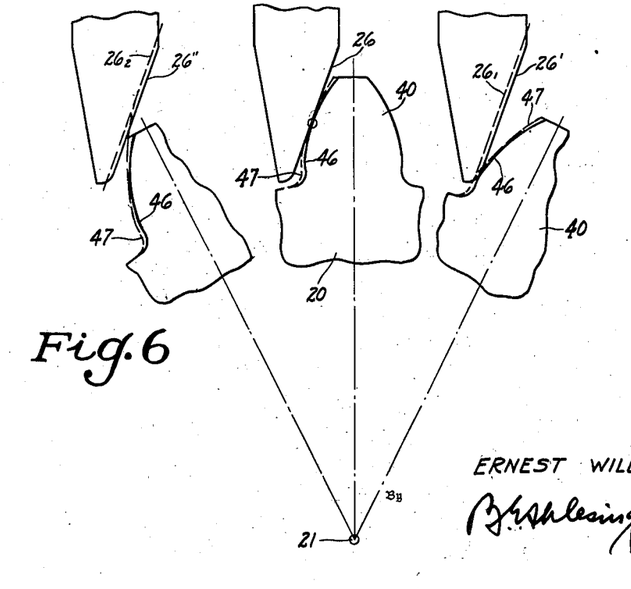
Fig. 6 is a similar view further illustrating the generation of the convex sides of the pinion teeth.

Figs. 3, 4 and 6 are views similar to Figs. 1, 2 and 5, respectively, but illustrating generation according to the method of the present invention of the convex sides of the teeth of the pinion 20 with the inside cutting edges 26 of the cutter C. To avoid "bias bearing," the convex sides of the pinion teeth are generated conjugate to a nominal crown gear having a slightly larger cone distance than the nominal crown gear which is employed for generating the concave sides of the teeth. Thus, a nominal crown gear may be chosen for generating the convex sides of the pinion teeth whose top surface is at 38 and whose axis is at 35, intersecting the axis 21 of the pinion blank in a point 36 whch is disposed beyond the pinion apex 22. The position of the crown gear center 36 may correspond to the position of the center of a tapered generating gear whose axis is at 37 and whose pitch cone angle is equal to that of the mate of the pinion to be generated and which is such as would be employed in prior practice to generate the convex tooth surfaces of the pinion.

Fig. 6 shows different positions of the cutter and blank in the generating roll. Here the rate of swing of the cutter about the axis of the nominal crown gear is modified as compared with the uniform rotation of the blank so that during equal turning angles of the blank about its axis 21, the inside cutting edges of the cutter assume positions 26', 26 and 26" which differ from the positions $26_1$, 26 and $26_2$ which they would assume were the cutter rolling with the blank at a uniform velocity. Thus, the inside cutting edges of the cutter will generate a tooth profile 46 on the tooth 40 of the pinion which is conjugate to the non-generated tooth of the mate gear and which differs from the substantially involute profile 47, shown in dotted lines, which would be generated on the pinion were the cutter being rolled with the pinion blank at a uniform velocity.

In Fig. 4, $24_a$, $24_b$, $24_c$, $24_d$, and $24_e$ denote different positions of the axis of the cutter for uniformly spaced positions of rotation of the pinion blank during the generation of the convex sides of a pinion tooth. In both Figs. 4 and 6 it is assumed again that the generating roll is divided and comprises rotation of the blank on its axis and swing of the cutter about the axis of the nominal crown gear. It will be noted that the unequal spacing of the points $24_a$, $24_b$, $24_c$, $24_d$, and $24_e$ in Fig. 4 is in just the reverse order from the unequal spacing of the points $24_1$, $24_2$, 24, 24' and 24" in Fig. 2. It will be noted that this same reversal in modifications is also illustrated in Fig. 6, as compared with Fig. 5. In Fig. 5, the rate of cutter movement is accelerated from right to left. In Fig. 6, it is decelerated from right to left. That is, for generating opposite sides of the teeth of a "formate" pinion the roll modification is preferably reversed.

In Figs. 1 to 6 inclusive, the generation of a pinion is illustrated where the generating roll is divided. It will be understood, however, that the present invention is equally applicable where all the roll is on the work or all the roll on the tool.

Figure 10:
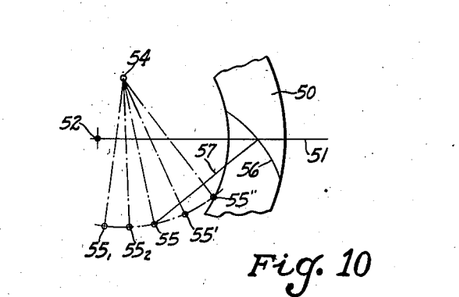
Fig. 10 is a diagrammatic view similar to Figs. 2 and 4 and illustrating one way in which the process of the present invention may be applied to the production of a hypoid pinion.

It will be understood, also, that the present invention may be applied to the generation of hypoid pinions as well as to the generation of spiral bevel pinions. Thus, as illustrated diagrammatically in Fig. 10, the tooth surfaces of a hypoid pinion 50, whose axis is at 51 and apex at 52, may be generated by rotating the pinion blank 50 on its axis 51 at a uniform velocity while producing a relative rotational movement between blank and cutter at a non-uniform velocity about the axis 54 of a nominal crown gear whose axis is offset from the axis 51 of the pinion blank. $55_1$, $55_2$, 55, 55' and 55" denote successive positions of the cutter axis during generation for equal turning angles of the work on its axis 51. 55 denotes the position of the cutter axis at the mean point in the roll. 56 denotes a tooth of the pinion being generated, and 57 the cutter radius at the mean point 55.

In generating pinions according to the method of the present invention, it is preferred to use face mill gear cutters having standard pressure angles. If these standard pressure angles in a given case differ from the root line pressure angles of the pinion tooth surfaces which it is desired to generate, the desired tooth surfaces may nevertheless be produced by providing a larger or smaller mean ratio of roll between cutter and blank, that is, by rolling the blank with the cutter as though it were rolling with a pitch cone angle larger than or smaller than its pitch cone angle on the pitch surface of the nominal crown gear represented by the cutter, as is also done sometimes in conventional generation.

This is illustrated in Figs. 7 and 8 for opposite sides of the teeth. Thus in these figures, we have shown a cutter 60 whose outside and inside cutting edges 61 and 62, respectively, have equal pressure angles, differing respectively, from the root line pressure angles of the tooth surfaces 63 and 64, respectively, which are to be prouced on the pinion blank 65. The base circle B (Fig. 7) or B' (Fig. 8) for generation of a given side of the pinion teeth may be determined in conventional manner by drawing a normal 67 or 68 to the pinion tooth profile 63 or 64, as the case may be, at a mean point 69 or 70, respectively, and by drawing the circle B or B', respectively, tangent to the normal and concentric to the axis 74 of the pinion blank. The blank must be rolled at a different instantaneous ratio, for generation of profiles of the correct pressure angle on a given side of its teeth, from the instantaneous ratio which would be employed were the pressure angles of the cutting edges of the cutter equal to the pressure angles which it is desired to produce on the pinion tooth surfaces. 75 denotes the instantaneous axis of generation for one side of the tooth and 76 for the other.

It has been found that where the pressure angle of the cutting edge of the cutter is smaller than the root line pressure angle of the pinion tooth surface to be generated, the blank should be rolled with the cutter as though it were rolling with a cone surface smaller than its pitch cone surface on the pitch surface of the nominal crown gear represented by the cutter. Likewise if the cutting edge of the cutter has a pressure angle larger than the root line pressure angle of the tooth surface to be generated, than the pinion blank is rolled with the cutter as though it were rolling with a cone surface of larger cone angle than its pitch cone surface on the pitch surface of the nominal crown gear represented by the cutter. This change of rolling cone is in addition, of course, to the modification in ratio of roll which is required in accordance with the present invention, to produce the desired profile shapes on the pinion tooth surfaces.

As has already been indicated, the present invention is not restricted to the generation of "formate" pinions where the cutter axis is parallel to the axis of the cradle and where the cutter represents a nominal crown gear. The invention also may be employed to advantage, for instance, on a spiral bevel or hypoid gear cutting machine where tilt and swivel adjustments of the cutter are provided but where the tilt angle adjustment is not sufficient to allow the cutter to be positioned to represent the mate gear of the pinion which is to be generated and where the radial adjustment of the cutter provided on the machine is not sufficient to permit the cutter to be positioned to represent a tooth of a crown gear.

Figure 9:
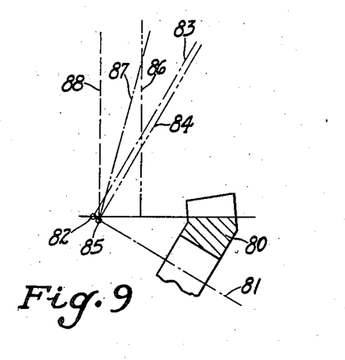
Fig. 9 is a view similar to Fig. 1 but illustrating how a pinion may be generated according to the method of this invention conjugate to a tapered gear instead of a crown gear, thereby to extend the range of a gear generating machine which is provided with angular adjustment of the cutter.

Thus, there is illustrated in Fig. 9 a further method of producing a spiral bevel pinion according to the process of the present invention. The pinion blank to be generated is denoted at 80. Its axis is at 81 and its cone apex at 82. 83 denotes the position of the axis of the tapered gear which is to mesh with the pinion 80. According to prior practice, as already described with reference to Fig. 1, the pinion would be generated conjugate to a tapered gear having the same pitch cone angle as the mate gear but having an axis at 84 slightly offset from the axis 83 of the mate gear and intersecting the pinion axis 81 in a point 85 offset from the pinion apex 82. If there is no gear cutting machine available in which the cutter axis can be adjusted angularly far enough to represent a tooth surface of a tapered gear whose axis is at 84, and if the machine available does not have sufficient range of radial adjustment to permit the cutter to represent a tooth surface of a nominal crown gear, then pinion tooth surfaces of the desired shape can still be generated by tilting the cutter angularly so that it represents a tooth surface of a tapered gear whose axis is at 87 and inclined at a smaller angle to the axis 88 of the nominal crown gear than is the axis 84. The blank is rotated on its axis 81 at a uniform velocity as an additional rotational movement is produced between cutter and blank at a varying velocity about the axis 87. By suitable modification of the ratio of roll, tooth surfaces may be generated on the pinion conjugate to the tooth surfaces of the mate non-generated gear.

In the embodiments of the invention illustrated in Figs. 1–6 inclusive, 9 and 10, the tooth surfaces of the pinion are generated conjugate to the tooth surfaces of the mate non-generated gear which therefore constitutes a basic gear. The mate gear being a non-generated gear has, of course, tooth surfaces of constant profile, straight or curved, depending upon whether its tooth surfaces are cut with a straight sided or curved profile cutting tool. Where the cutter employed in cutting the mate gear is a face-mill, the mate gear has usually either conical or spherical surfaces depending upon whether the face-mill has straight side cutting edges of positive pressure angle or cutting edges of circular arcuate profile. The nominal crown gear used as the generating gear in the embodiment illustrated in Figs. 1 to 6 inclusive and 10 or the tapered gear used as the generating gear in the embodiment illustrated in Fig. 9 has, as shown, teeth whose spiral angle is approximately the same as the spiral angle of the teeth of the mate gear.

Figure 11:
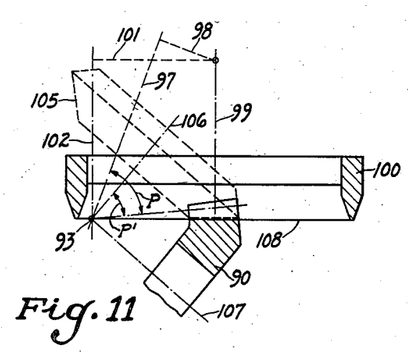
Figs. 11 and 12 are diagrammatic views similar to Figs. 1 and 2 but illustrating how the method of the present invention may be employed to extend further the range of a given spiral bevel gear generating machine by making it possible to generate a ring gear of low or zero spiral angle conjugate to a tapered generating gear instead of to a crown gear.
Figure 12:
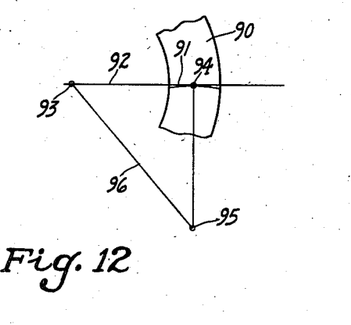

Figs. 11 and 12 illustrate a further application of the invention showing particularly how the invention may be employed in the generation of the ring gear where both gear and pinion are to be generated. This modification is illustrated as applied to the generation of a ring gear of low or zero spiral angle on a gear cutting machine having cutter tilt and swivel angle adjustments but not having sufficient radial adjustment of the cutter to permit of cutting the desired spiral angle. 90 denotes the gear blank whose tooth surfaces are to be cut. This gear has teeth of zero spiral angle, that is, the median line 91 of a tooth of the gear is tangent at a point 94 midway the ends of the tooth zone of the gear to a line 92 drawn radially of the gear apex 93. The center of the tooth curve 91 is at 95 which, of course, corresponds to the position of the center or axis of the cutter which is employed in the generation of the tooth. It will be obvious that the center 95 is at a greater radial distance 96 from the gear apex 93 than would be the case if the gear teeth were of positive spiral angle. Hence, the face mill gear cutter used for generating the tooth surfaces of the gear must be positioned at a greater radial distance from the gear apex than would be the case if tooth surfaces of positive spiral angle were being cut on the gear.

It is assumed that the gear 90 cannot be generated conjugate to a nominal crown gear because the radial setting 96 required for the cutter is in excess of the range of the gear cutting machine. The radial setting can be reduced, however, and brought within the range of the machine if the gear 90 is generated conjugate to a tapered gear having, for instance, its axis at 97. The distance 98 of the axis 99 of the cutter 100 from the axis 97 is thus reduced as compared with the distance 101 of the axis 99 of the cutter from the axis 102 of a nominal crown gear.

Figure 13:
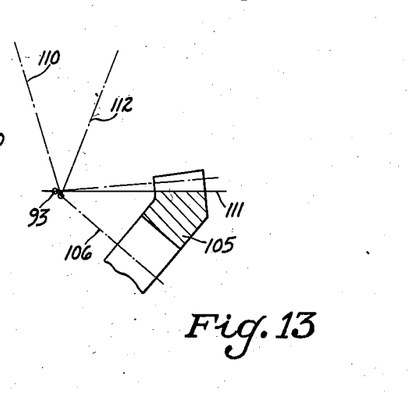
Fig. 13 is a diagrammatic view similar to Fig. 11 but illustrating how the method of the present invention may be applied to the production of the pinion which is to mesh with a ring gear produced according to the method illustrated in Figs. 11 and 12.

In Fig. 11, there is shown in dotted lines at 105 the pinion which is to mesh with the gear 90. The axis of this pinion is denoted at 106 and its pitch cone angle is denoted at P'. It intersects the axis 107 of the gear in their common apex 93.

Where the ring gear 90 is generated in the manner described conjugate to a tapered gear whose pitch cone angle P is less than ninety degrees, the mating pinion 105 should be generated conjugate to a tapered generating gear whose pitch cone angle is supplementary to the pitch cone angle P of the tapered generating gear, employed in the generation of the gear 90. Thus, the pinion 105 should be generated conjugate to a tapered gear whose axis 110 (Fig. 13) is inclined to the root surface 111 of the pinion at an angle as much greater than 90° as the angle between the axis 97 and the root surface 108 of the gear is less than 90°. By applying the principles of the present invention, however, tooth surfaces may be generated on the pinion 105 conjugate to those of the gear 90 by rolling the pinion with a tapered gear whose pitch cone angle is less than 90° and by compensating for the difference in pitch angle by modifying the ratio of roll during generation. Thus, the pinion may be generated conjugate to a tapered gear whose axis is at 112 inclined to the root cone of the pinion at an angle less than 90°. In this way, the settings required for generating the pinion may also be brought within the range of the generating machine.

In the embodiment of the invention illustrated in Figs. 11 and 12, the tooth surfaces generated on gear and pinion are the same in shape as those heretofore employed on generated gear pairs for transmitting uniform motion, that is, they are conjugate to the tooth surfaces of complemental crown gears. The crown gears have, of course, tooth surfaces of constant profile, conical or spherical, if represented by a face-mill cutter. The tapered generating gears employed in producing the two members of the pair have, in the instances illustrated, the same spiral angle as the gears themselves, that is as the basic crown gears also.

Figure 14:
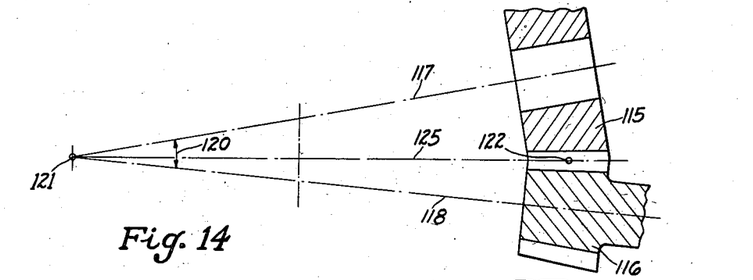
Fig. 14 is a sectional view, showing a pair of long cone distance angular spiral bevel gears in mesh with one another.
Figure 15:
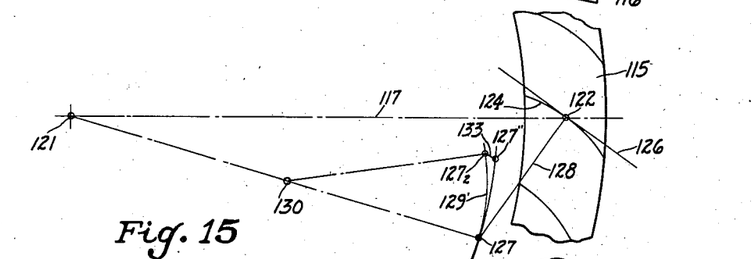
Fig. 15 is a diagrammatic front elevation illustrating one method of producing such gears according to the present invention.
Figure 16:
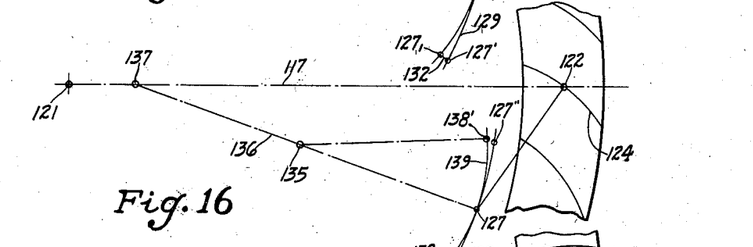
Fig. 16 is a similar view illustrating another method of producing such gears according to the present invention.

A further application of the invention is illustrated in Figs. 14 to 16 inclusive. 115 and 116 designate, respectively, a pair of angular spiral bevel gears whose axes 117 and 118, respectively, are inclined to one another at a relatively small angle 120 but whose cone distance (distance between their common cone apex 121 and a mean point of contact 122) is relatively large. In Fig. 15, 124 denotes a tooth surface of one of the gears developed into the common pitch plane 125 of the gears. 126 is a tangent to the tooth surface 124 at the mean point 122. The center of the tooth surface, which corresponds to the mean position of a face-mill gear cutter required to produce the same, is denoted at 127 and the radius of the tooth surface and of the cutter for producing it is denoted at 128.

Ordinarily to generate the tooth surfaces of the gear 115, the blank would be rotated on its axis 117 at a uniform velocity and simultaneously the blank and the cutter would be swung relative to one another at a uniform velocity about the axis of a basic generating gear which intersects the work axis in the apex 121. Thus in the ordinary method of generation, where the roll is divided, the cutter would be swung about the axis 121 at a uniform velocity and the cutter center would assume different equi-spaced positions 127', 127 and 127'' while the blank was turning at a uniform velocity about its axis 117. This method of generation requires a very large gear generating machine, a machine which has enough adjustment so that the cutter center may be set the full distance 121—127 away from the cradle axis. The machine, moreover, would be entirely out of proportion in size to the size of the gears to be produced.

With the process of the present invention, however, a much smaller machine may be employed. Thus, gear and pinion may be generated conjugate to a basic gear whose axis is at 130, offset from the axis 117 of the blank. This reduces the radial setting of the cutter to the distance 130—127. Either gear may then be generated by rotating the work on its axis at a uniform velocity and simultaneously swinging the cutter at a varying velocity about axis 130. If the roll is divided the cutter center will swing on the circle 129' concentric to the apex 130. The ratio of generating roll should be so modified that at opposite ends of the generating roll the cutter center will have the positions $127_1$ and $127_2$, respectively, which lie on lines 132 and 133, respectively, passing through the points 127' and 127'', respectively, that denote the opposite ends of the roll in conventional generation. The lines 132 and 133 are parallel to the tangent 126 to the tooth surface 124. The distance 127—$127_2$ is greater than the distance $127_1$—127. That is to generate proper tooth profiles on the gear 115 and pinion 116 when the cradle axis is at 130, the cutter will be swung at a varying velocity about the cradle axis during the generating roll. In this way, suitably conjugate gears free from undue undercut and free from "bias bearing" may be produced.

In the embodiment of the invention illustrated in Fig. 15, the apex 130 of the basic generating gear lies on a line connecting the gear apex 121 and the mean position 127 of the cutter center. Gears of long cone distance may be generated, however, even though the apex of the generating gear is not exactly in line with the apex of the gear being cut. Thus, as illustrated in Fig. 16, the apex of the generating gear may be at 135, lying on a line 136 which intersects the gear axis in a point 137 offset from the gear apex 121. To generate proper tooth profiles on the gear blank, the blank will be rotated on its axis at a uniform velocity while the cutter is rotated in engagement with it and simultaneously swung about the axis 135 at a varying velocity so that at opposite ends of the generating roll the cutter center will have assumed positions 138 and 138'. These points lie on the circle 139 concentric to the apex 135 and are such that lines connecting the points 138 and 127' and the points 138' and 127'', respectively, will be approximately parallel to the tangent 126 to the tooth surface 124 at the mean point 122.

It has been proposed heretofore to generate gears of small shaft angle and large cone distance conjugate to gears having a shorter cone distance, but in such methods as were previously proposed, the angle 130—127—122 or 135—127—122 was required to be a right angle. This was often a serious restriction as it was often inconvenient to get the proper settings on a given gear generating machine. With the method of the present invention, this restriction is eliminated as the angle between the line connecting the cutter center with the generating gear apex and a normal to the tooth curve at a mean point, may, as shown, in Figs. 15 and 16 be other than a right angle.

Figure 17:
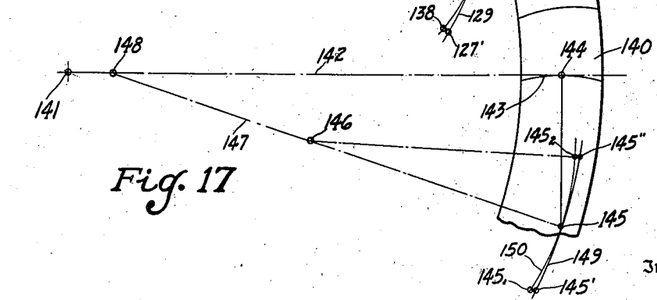
Fig. 17 is a diagrammatic view illustrating one method of producing according to the present invention bevel gears of zero spiral angle, small shaft angle, and long cone distance.

The method of the present invention may be applied to the generation of bevel gears of small shaft angle and long cone distance regardless of their spiral angle. Thus as shown in Fig. 17, it may be applied also to the generation of such gears where they have zero spiral angle. Here, 140 denotes a gear of zero spiral angle whose apex is at 141 and whose axis is at 142, and whose teeth 143 are curved longitudinally so that a line drawn radially of the gear apex will be tangent to a tooth 143 at a point 144 midway of the tooth zone of the gear.

In a prior method of generation, the tooth surfaces of the gear might be generated by rolling the work relative to the cutter about an axis 148 which intersects the work axis and lies between the gear apex 141 and the tooth zone of the gear. Thus, as the work is rotated at a uniform velocity on its own axis 142, the cutter might be swung about the axis 148 so that the center of the cutter is displaced at a uniform velocity about the center 148 and would assume different equi-spaced positions 145', 145 and 145" for equal turning angles of the work.

With the method of the present invention, the gear may be generated conjugate to a basic gear whose apex is at 146 on a line 147 which passes through the cutter center 145 at a mean position of the generating roll and which intersects the gear axis 142 in the point 148. In generating the gear according to the method of the present invention, the blank and the cutter will be rolled relative to one another about the apex 146 while the ratio of roll between the cutter and blank is continuously varied. Thus, while the blank is rotating at a uniform velocity on its axis, the cutter may be so swung about the axis 146 that its center travels on a circle 150 concentric with the apex 146 and the cutter center assumes positions 145₁ and 145₂ at the ends of the generating roll. It will be noted that here again lines connecting points 145₁ and 145' and connecting points 145₂ and 145" will be parallel to a tangent to the tooth surface at the mean contact point 144.

In the applications of the invention illustrated in Figs. 14 to 17 inclusive, the modification in the ratio of roll may be in the same direction in generating both sides of the teeth. Here again the tooth surfaces generated on the gears are substantially the same as the tooth surfaces used heretofore on generated tapered gears for transmitting uniform motion, viz. conjugate to crown gears. In the instances illustrated in Figs. 14 to 17 inclusive, however, the tapered generating gears whose axes are at 130, 135 or 146 have different spiral angles from the basic gears whose axes are at 121 or 141, because of the offset of the axes 130, 135 and 146.

While the invention has been described in connection with the production of gears with a face-mill type of gear cutter, it will be understood that the principles of the invention may also be employed for generating gears with other forms of cutting tools. It will be further understood that the term "cutting tool" is intended to include grinding tools, and that, for instance, gears may be generated according to the present invention with rotary annular grinding wheels or other forms of grinding tools. In general it may be said that while the present invention has been described in connection with particular embodiments thereof, this application is intended to cover any variations, uses, or adaptations of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of generating tooth surfaces of a longitudinally curved tooth bevel gear which comprises rotating a face mill gear cutter in engagement with a tapered gear blank while rotating the blank on its axis and simultaneously producing a relatively rotary movement between the cutter and blank about an axis intersecting the blank axis and inclined to the blank axis at an angle different from the angle between the axis of the gear being cut and its mate when the pair are in mesh, the ratio of the last two motions being varied during generation of a tooth surface.

2. The method of generating tooth surfaces of a hypoid gear which comprises rotating a face-mill gear cutter in engagement with a tapered gear blank while rotating the blank on its axis and simultaneously producing a relative rotary movement between the cutter and blank about an axis inclined to but offset from the blank axis, the ratio of the last two motions being varied during generation of a tooth surface.

3. The method of generating tooth surfaces of a given pressure angle on a longitudinally curved tooth tapered gear which comprises rotating a face mill gear cutter having side cutting edges of different pressure angle in engagement with a tapered gear blank while producing a relative rolling movement between the cutter and blank as though the blank were rolling with a surface other than its pitch surface on the pitch surface of a basic gear other than its mate, and varying the ratio of said rolling movement during generation of a tooth surface.

4. The method of generating one member of a pair of longitudinally curved tooth tapered gears of which the other member has non-generated tooth surfaces which comprises rotating a face mill gear cutter in engagement with a tapered gear blank while rotating the blank at a uniform velocity on its axis and producing an additional relative motion between the cutter and blank at a varying velocity about an axis inclined to the cutter axis and inclined to the blank axis at an angle different from the angle between the gear being cut and its mate.

5. The method of generating the tooth surfaces of a tapered gear which comprises generating each side of its teeth by moving a tool in a longitudinally inclined path across the face of a tapered gear blank while rotating the blank on its axis and simultaneously producing an additional relative movement between cutter and blank about an axis which is inclined to the blank axis and offset from the blank apex, the latter axis being offset in one direction for generating one side of the teeth, and in the opposite direction for generating the opposite side of the teeth, and the ratio of generating roll being varied during generation of both sides of the teeth but the variation in ratio of roll being reversed for opposite sides of the teeth.

6. The method of generating tooth surfaces of a longitudinally curved tooth tapered gear which comprises rotating a face mill gear cutter in engagement with a tapered gear blank while rotating the blank on its axis at a uniform velocity and producing an additional relative movement between the cutter and blank about an axis inclined to the blank axis at a varying velocity, the last named movement being different during generation of one side of the teeth from that employed during generation of the opposite side of the teeth.

7. The method of generating tooth surfaces of a longitudinally curved tooth tapered gear which comprises rotating a face mill gear cutter in engagement with a tapered gear blank while rotating the blank on its axis at a uniform velocity and producing an additional relative motion between the cutter and blank at a varying velocity about an axis inclined both to the cutter axis and the axis of the blank.

8. The method of generating tooth surfaces of a longitudinally curved tooth bevel gear of relatively long cone distance which comprises rotating a face mill gear cutter in engagement with a tapered gear blank while rotating the blank on its axis and simultaneously producing a relative movement between the cutter and blank at a varying velocity about an axis offset from and angularly disposed to the blank axis.

9. The method of generating tooth surfaces of a longitudinally curved tooth gear of relatively long cone distance which comprises rotating a face mill gear cutter in engagement with a tapered gear blank while rotating the blank on its axis at a uniform velocity and simultaneously producing an additional relative motion between the cutter and blank at a varying velocity about an axis angularly disposed to the blank axis and offset from the blank axis and lying on a line which passes through the cutter axis and which intersects the blank axis in a point between the blank apex and the tooth zone of the blank.

10. The method of generating tooth surfaces of a longitudinally curved tooth bevel gear which comprises rotating a face mill gear cutter in engagement with a tapered gear blank while rotating the blank on its axis at a uniform velocity and simultaneously producing an additional relative motion between the cutter and the blank at a varying velocity about an axis which is parallel to the cutter axis and intersects the blank axis in a point lying beyond the blank apex.

11. The method of generating tooth surfaces of a longitudinally curved tooth tapered gear which comprises cutting each side of the teeth by rotating a face mill gear cutter in engagement with a tapered gear blank while rotating the blank on its axis at a uniform velocity and simultaneously producing an additional relative motion between the cutter and blank at a varying velocity about an axis which is parallel to the cutter axis and inclined to the blank axis, the blank being positioned during generation of one side of the teeth so that said axis intersects the blank axis in a point lying between the blank apex and the tooth zone of the gear and the blank being positioned during generation of the opposite side of the teeth so that said axis intersects the blank axis in a point lying beyond the blank apex.

12. The method of generating tooth surfaces of one member of a pair of longitudinally curved tooth tapered gears which comprises rotating a face mill gear cutter in engagement with a tapered gear blank while rotating the blank on its axis and simultaneously producing an additional relative motion between the cutter and blank about an axis inclined both to the cutter axis and to the blank axis, the angle of inclination of said axis being different from the angle between the gear being cut and its mate when the pair are in mesh, and varying the ratio of the blank rotation to said additional motion during generation of a tooth surface.

13. The method of generating a pair of tapered gears each of which has teeth so curved longitudinally that a line drawn radially of the apex of a gear is tangent to a median line of a tooth of the gear at a point between the ends of the tooth, which comprises generating the tooth surfaces of each member of the pair by rotating a face mill gear cutter in engagement with a tapered gear blank while rotating the blank on its axis at a uniform velocity and producing an additional relative motion at a variable velocity between the cutter and blank about an axis inclined to the cutter axis and inclined to the blank axis at an angle greater than the angle between the axes of the gear being cut and its mate when the pair are in mesh.

14. The method of generating the tooth surfaces of a tapered gear which comprises actuating a cutting tool while producing a relative rolling movement at a varying ratio between the tool and a tapered gear blank about an axis inclined to the blank axis, the variation in ratio of roll employed during generation of one side of the gear teeth being different from that employed during generation of the opposite side of the gear teeth.

15. The method of generating the tooth surfaces of a tapered gear which comprises actuating a cutting tool while producing a relative rolling movement at a varying ratio between the tool and a tapered gear blank about an axis inclined to the blank axis, the ratio of the movement of the tool to the movement of the blank during roll in one direction being accelerated for generation of one side of the gear teeth and being decelerated during generation of the opposite side of the gear teeth.

16. The method of generating the tooth surfaces of a tapered gear which comprises moving the tool in a longitudinally inclined path across the face of a tapered gear blank while producing a relative rolling movement at a varying ratio between the tool and blank about an axis inclined to and offset from the blank axis.

17. The method of generating the tooth surfaces of a tapered gear which comprises moving a tool in a longitudinally inclined path across the face of a tapered gear blank while producing a relative rolling movement at a varying ratio between the tool and blank about an axis inclined to and offset from the blank axis, the variation in ratio of roll employed during generation of one side of the gear teeth being different from that employed during generation of the opposite side of the gear teeth.

18. The method of generating the tooth surfaces of a tapered gear which comprises moving a tool in a longitudinally inclined path across the face of a tapered gear blank while producing a relative rolling movement at a varying ratio between the tool and blank about an axis inclined to and offset from the blank axis, the ratio of the movement of the tool to the movement of the blank being accelerated during roll in one direction for generation of one side of the gear teeth, and being decelerated during roll in the same direction for generation of the opposite side of the gear teeth.

19. The method of generating the tooth surfaces of one member of a pair of longitudinally curved tooth tapered gears of which the other member has non-generated tooth surfaces which comprises rotating a face-mill gear cutter in engagement with a tapered gear blank while producing a relative rolling motion at a varying ratio between the cutter and blank about an axis parallel to the cutter axis and inclined to the blank axis at an angle different from the angle between the axis of the gear being cut and its mate when the pair are in mesh.

20. The method of generating the tooth surfaces of a longitudinally curved tooth tapered gear conjugate to the tooth surfaces of a mate non-generated gear which comprises rotating a face-mill gear cutter in engagement with a tapered gear blank while producing a relative rolling motion at a varying ratio between the cutter and blank about an axis parallel to the cutter axis and inclined to but offset from the blank axis.

21. The method of generating the tooth surfaces of a longitudinally curved tooth tapered gear conjugate to the tooth surfaces of a mate non-generated gear which comprises rotating a face-mill gear cutter in engagement with a tapered gear blank while producing a relative rolling motion at a varying ratio between the cutter and blank about an axis parallel to the cutter axis and inclined to the blank axis, the variation in ratio of roll employed during generation of one side of the gear teeth being different from that employed during generation of the opposite side of the gear teeth.

22. The method of producing a tapered gear which comprises rotating a face-mill gear cutter in engagement with a tapered gear blank while producing a relative rolling movement at a varying ratio between the cutter and blank as though the blank were rolling with a tapered gear having a pitch cone angle different from the pitch cone angle of the mate of the gear to be generated and smaller than the pitch cone angle of a crown gear, the variation in ratio of roll employed during generation of one side of the gear teeth being different from that employed during generation of the opposite side of the gear teeth.

23. The method of generating the tooth surfaces of one member of a pair of longitudinally curved tooth tapered gears of which the other member has non-generated tooth surfaces, which comprises moving a tool in a longitudinally curved path across the face of a tapered gear blank while rotating the blank on its axis and producing a relative rotational movement between the tool and blank about an axis inclined to the blank axis at an angle different from the angle between the axis of the gear being cut and its mate when the pair are in mesh, and varying the ratio of said rotational movements during generation of a tooth surface.

24. The method of generating the tooth surfaces of one member of a pair of tapered gears of which the other member has non-generated tooth surfaces, which comprises moving the tool across the face of a tapered gear blank while rotating the blank on its axis and producing a relative rotational movement between the tool and blank about an axis perpendicular to the root surface of the blank, and varying the ratio of said rotational movements during generation of a tooth surface.

25. The method of producing a pair of tapered gears which have longitudinally inclined teeth which comprises generating the tooth surfaces of each member of the pair by moving a tool in a longitudinally inclined path across the face of a tapered gear blank while rotating the blank on its axis and effecting an additional rotational movement between the tool and blank about an axis inclined to the blank axis at an angle different from the angle between the axes of the pair when in mesh and inclined to the root surface of the blank at less than 90°, and varying the ratio of said rotational movements during generation of a tooth surface.

26. The method of generating the tooth surfaces of one member of a pair of tapered gears of which the other member has non-generated tooth surfaces, which comprises imparting a cutting motion to a tool to produce the lengthwise tooth shape of a tooth surface, while rotating the blank on its axis and while producing an additional relative rotational movement between the tool and blank about an axis inclined to the blank axis at an angle different from the angle between the axis of the gear being cut and its mate when in mesh and which is inclined to the root surface of the gear blank at an angle less than 90°, and varying the ratio of said rotational movements during generation of a tooth surface of the gear.

27. The method of generating the tooth surfaces of a tapered gear conjugate to the tooth surfaces of a given gear, that has teeth of constant profile from end to end and a given spiral angle, which comprises positioning a face-mill gear cutter relative to a gear blank so that the cutter will represent a gear whose teeth have the same spiral angle as the given gear, and rotating the cutter in engagement with the blank while producing a relative rolling motion at a varying ratio between the cutter and blank as though the blank were rolling with a gear whose pitch cone angle is different from the pitch cone angle of the given gear.

ERNEST WILDHABER.